US012780237B2

(12) United States Patent
Yamada et al.

(10) Patent No.: US 12,780,237 B2
(45) Date of Patent: Nov. 3, 2026

(54) VEHICLE CONTROL APPARATUS

(71) Applicant: TOYOTA JIDOSHA KABUSHIKI KAISHA, Aichi (JP)

(72) Inventors: Atsuko Yamada, Toyota (JP); Toru Miyamoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 20 days.

(21) Appl. No.: 18/967,655

(22) Filed: Dec. 4, 2024

(65) Prior Publication Data

US 2025/0196880 A1 Jun. 19, 2025

(30) Foreign Application Priority Data

Dec. 14, 2023 (JP) ................................ 2023-211164

(51) Int. Cl.

| | |
|---|---|
| ***B60W 50/16*** | (2020.01) |
| ***G05D 1/224*** | (2024.01) |
| *B60W 50/14* | (2020.01) |
| *G05D 109/10* | (2024.01) |

(52) U.S. Cl.

CPC ............ *B60W 50/16* (2013.01); *G05D 1/224* (2024.01); *B60W 2050/143* (2013.01); *B60W 2050/146* (2013.01); *G05D 2109/10* (2024.01)

(58) Field of Classification Search

CPC ... B62D 15/0285; B60W 50/16; G08G 1/162; G08G 1/143; G08G 1/22; H04W 4/44; G05D 1/0027

See application file for complete search history.

(56) References Cited

U.S. PATENT DOCUMENTS

| | | | | |
|---|---|---|---|---|
| 11,128,657 | B2 * | 9/2021 | Kishikawa | H04L 63/1441 |
| 2020/0143683 | A1 | 5/2020 | Maruiwa et al. | |
| 2020/0302773 | A1 * | 9/2020 | Okada | B60K 35/26 |
| 2020/0307639 | A1 * | 10/2020 | Tsuji | B60W 60/0059 |
| 2022/0234606 | A1 * | 7/2022 | Okuhara | G08G 1/166 |
| 2022/0315059 | A1 * | 10/2022 | Ito | B60W 50/0205 |
| 2022/0410802 | A1 * | 12/2022 | Aladas | B60W 50/16 |
| 2023/0102751 | A1 * | 3/2023 | Sannodo | G05D 1/0022 701/2 |
| 2024/0294141 | A1 * | 9/2024 | Morosawa | B60R 25/305 |

FOREIGN PATENT DOCUMENTS

| | | |
|---|---|---|
| JP | 2020-077064 A | 5/2020 |
| JP | 2023-114501 A | 8/2023 |

* cited by examiner

*Primary Examiner* — Mirza F Alam

(74) *Attorney, Agent, or Firm* — HAUPTMAN HAM, LLP

(57) ABSTRACT

A vehicle control apparatus executes an automatic driving control for driving a vehicle to a target space based on an instruction transmitted by a remote operation apparatus that a user outside the vehicle operates. The vehicle control apparatus stops the vehicle and makes the remote operation apparatus perform a first notification, when a predetermined stop condition is satisfied while the automatic driving control is being executed. The vehicle control apparatus makes the remote operation apparatus perform a second notification in a manner that is different from the first notification, when the user does not approach the vehicle after the first notification.

2 Claims, 6 Drawing Sheets

| | REMOTE OPERATION APPARATUS | | | INSIDE VEHICLE | | OUTSIDE VEHICLE |
|---|---|---|---|---|---|---|
| | SOUND | DISPLAY | VIBRATION | SOUND | DISPLAY | |
| FIRST NOTIFICATION | NONE | FIRST MESSAGE | NONE | PAWN | CONTROL IS STOPPED | NONE |
| SECOND NOTIFICATION | FIRST SOUND PATTERN $Ts \leftarrow Ts1$ | SECOND MESSAGE | FIRST VIBRATION PATTERN $Tv \leftarrow Tv1$ | PAWN | CONTROL IS STOPPED | FIRST ACTUATION PATTERN $To \leftarrow To1$ |
| THIRD NOTIFICATION | SECOND SOUND PATTERN $Ts \leftarrow Ts2$ $Ts2 < Ts1$ | THIRD MESSAGE | SECOND VIBRATION PATTERN $Tv \leftarrow Tv2$ $Tv2 < Tv1$ | PAWN | CONTROL IS STOPPED | SECOND ACTUATION PATTERN $To \leftarrow To2$ $To2 < To1$ |
| EMPHASIS NOTIFICATION | THIRD SOUND PATTERN $Ts \leftarrow Ts3$ $Ts3 < Ts2$ | ANY ONE OF FIRST MESSAGE, SECOND MESSAGE AND THIRD MESSAGE | THIRD VIBRATION PATTERN $Tv \leftarrow Tv3$ $Tv3 < Tv2$ | PAWN | CONTROL IS STOPPED | THIRD ACTUATION PATTERN $To \leftarrow To3$ $To3 < To2$ |

FIG.5

VEHICLE CONTROL APPARATUS

RELATED APPLICATIONS

The present application claims priority to Japanese Patent Application No. 2023-211164, filed Dec. 14, 2023, the disclosure of which is hereby incorporated by reference herein in its entirety.

TECHNICAL FIELD

The present disclosure relates to a vehicle control apparatus configured to execute an automatic driving control for automatically driving a vehicle to a target space in response to an operation of a remote operation apparatus by a user outside the vehicle.

BACKGROUND

Conventionally, there has been known a vehicle control apparatus configured to execute an automatic driving control, which is a type of automatic driving. For example, a vehicle control apparatus described in Patent Document 1 (hereinafter referred to as a "conventional apparatus") executes a remote parking control as the automatic driving control. The remote parking control is a control for driving the vehicle to the target space to park the vehicle in response to a parking command transmitted by a remote operation apparatus operated by a user outside the vehicle.

Patent Document 1: Japanese Patent Application Laid-Open No. 2023-114501

SUMMARY

In the automatic driving control, the user outside the vehicle operates the remote operation apparatus to driving the vehicle to the target space, and the vehicle stops when a predetermined stop condition is satisfied. For example, the stop condition is satisfied when a travel distance traveled by the vehicle in the automatic driving control is equal to or longer than a threshold. When the stop condition is satisfied and the vehicle stops, the user needs to get into the vehicle.

It is considered that the remote operation apparatus notifies the user when the stop condition is satisfied. However, if this notification is uniformly performed without depending on the user's situation, the user who is not approaching the vehicle may not notice the notification, and the user who is approaching the vehicle may feel the notification bothersome.

The present disclosure is made to address the above problem. That is, one of the objects of the present disclosure is to provide a vehicle control apparatus configured to be able to reduce a possibility that the user does not notice the notification and a possibility that the user feels the notification bothersome by performing an appropriate notification depending on the user's situation when the stop condition is satisfied.

A vehicle control apparatus according to the present disclosure (hereinafter, referred to as the "present disclosure apparatus") is configured to execute an automatic driving control for driving a vehicle to a target space based on an instruction transmitted by a remote operation apparatus that a user outside the vehicle operates (steps 200 through 295).

The vehicle control apparatus is configured to:

stop the vehicle (step 255) and make the remote operation apparatus perform a first notification ("Yes" at step 415, step 420), when a predetermined stop condition is satisfied while the automatic driving control is being executed ("Yes" at step 230); and make the remote operation apparatus perform a second notification in a manner that is different from the first notification ("No" at step 415, step 425), when the user does not approach the vehicle after the first notification ("No" at step 315, step 345).

According to the present disclosure apparatus, when the user does not approach the vehicle after the first notification, the second notification is performed in the manner that is different from the first notification. Therefore, the present disclosure apparatus can reduce a probability that the user who does not approach the vehicle does not notice the notification. When the user approaches the vehicle, the second notification is not performed. Therefore, the present disclosure apparatus can reduce a probability that the user feels the notification bothersome.

BRIEF DESCRIPTION OF THE DRAWINGS

FIG. 5 is a drawing for describing a summary of each notification that is performed when a stop condition is satisfied.

DETAILED DESCRIPTION

Figure 1:
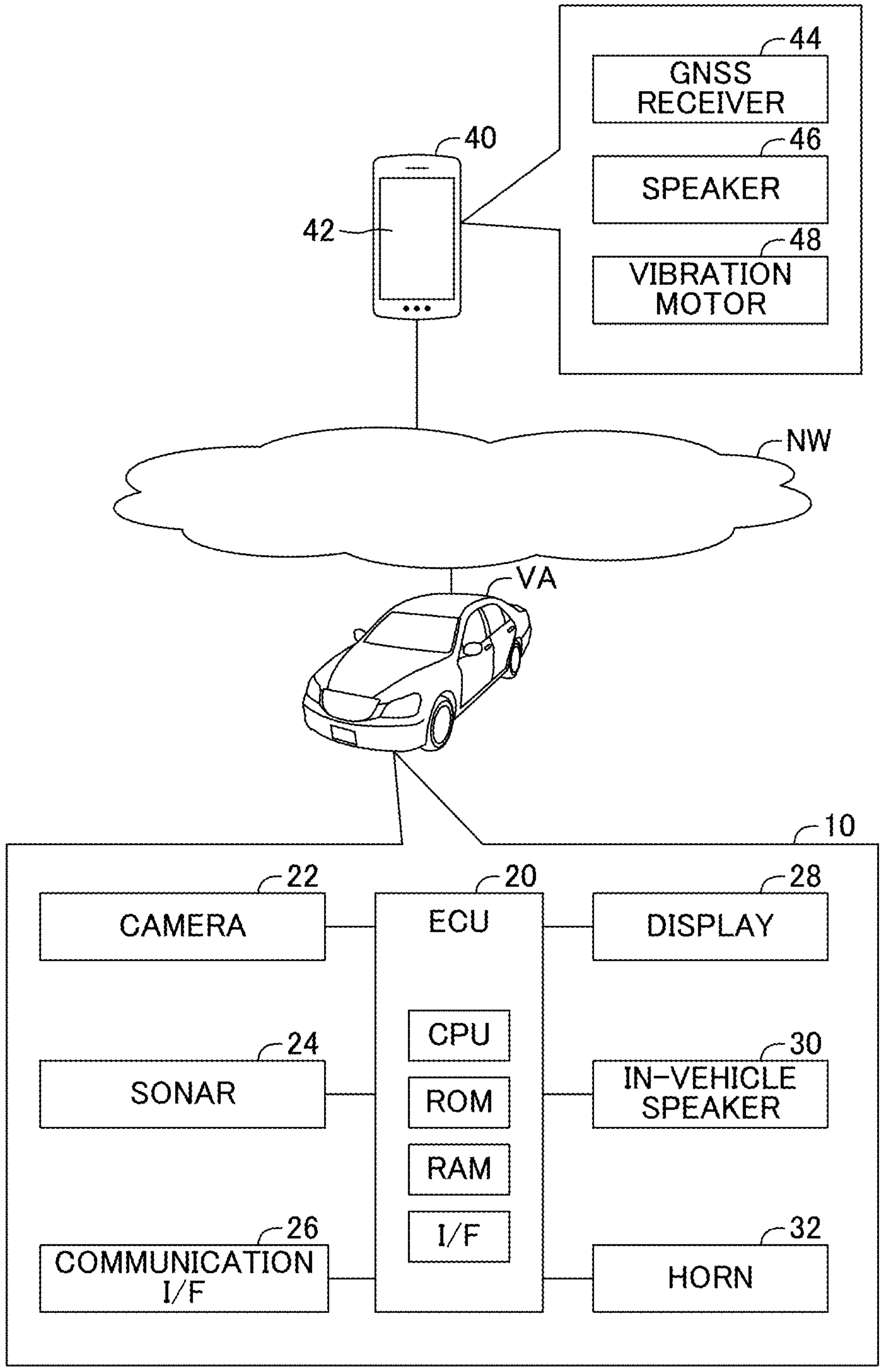
FIG. 1 is a schematic system configuration diagram of a vehicle control system according to an embodiment of the present disclosure.

As shown in FIG. 1, a vehicle control system comprises a vehicle control apparatus 10 applied to a vehicle VA and a remote operation apparatus 50. The vehicle control apparatus 10 and the remote operation apparatus 50 are communicatively connected via a network NW.

The parking support apparatus 10 comprises components shown in FIG. 1. In this specification, the "ECU 20" is an electronic control unit with a microcomputer as a main part. The ECU 20 is also referred to as a control unit, a controller and a computer. The microcomputer includes a CPU (processor), a ROM, a RAM, and an interface (I/F), etc. Functions realized by the ECU 20 may be realized by multiple ECUs.

A camera 22 acquires image data by capturing a scenery around the vehicle VA. The ECU 20 acquires image data from the camera 22. A sonar 24 acquires sonar data about a position of an object around the vehicle VA with respect to the vehicle VA. The ECU 20 acquires the sonar data from the sonar 24. The ECU 20 detects a target space and the object located around the vehicle VA based on the image data and the sonar data. A communication interface (I/F) 28 is an interface for connecting to the network NW.

A display 28 is arranged in a cabin of the vehicle VA. For example, the display 28 is a multi-information display. An in-vehicle speaker 30 is arranged in the cabin of the vehicle VA and outputs a warning sound inside the vehicle VA. A horn 32 outputs the warning sound outside of the vehicle VA.

The remote operation apparatus 40 is an apparatus that can be operated even when the user is outside the vehicle VA. For example, the remote operation apparatus 40 is a smartphone. The remote operation apparatus 40 comprises a display 42, a GNSS (Global Navigation Satellite System) receiver 44, a speaker 46, and a vibration motor 48. The display 42 is a touch panel display. The user inputs data to the remote operation apparatus 40 by touching the display 42. If the display 42 is not the touch panel display, the remote operation apparatus 40 comprises an input device.

The GNSS receiver 44 receives signals from multiple satellites and specifies the current position (latitude and longitude) of the remote operation apparatus 40 based on the received signals. A speaker 46 outputs a warning sound. A vibration motor 48 is a motor for vibrating the remote operation apparatus 40.

(Outline of Operation)

In the present embodiment, an example in which a summon control is executed as an automatic driving control is described. There are two types of summon control: a smart summon control and a reverse summon control.

In the smart summon control, the vehicle VA sets the current position of the remote operation apparatus 40 or the user's designated position as the target space, automatically drives to the target space, and stops at the target space. In the reverse summon control, when the user gets off the vehicle VA at an entrance of a parking lot and operates the remote operation apparatus 40, the vehicle VA automatically driving with searching for a parking space where the vehicle VA can park. If the parking space is found, the vehicle VA parks in that parking space. In other words, the smart summon control and the reverse summon control have in common that the vehicle VA automatically drives to the target space and stops at the target space while the user is outside the vehicle.

The user outside the vehicle VA operates the remote operation apparatus 40 to start an application for the summon control. When the user operates a start button for the smart summon control, the vehicle control apparatus 10 starts the smart summon control. Similarly, when the user operates a start button for the reverse summon control, the vehicle control apparatus 10 starts the reverse summon control. After the summon control starts, the driving button is displayed on the display 42. When the user operates the driving button, the remote operation apparatus 40 transmits a permission signal to the vehicle control apparatus 10. The vehicle control apparatus 10 automatically drives the vehicle VA based on the permission signal.

If a predetermined stop condition is satisfied while the vehicle control apparatus 10 is executing the summon control, the vehicle control apparatus 10 stops the summon control and stops the vehicle VA. In this case, the vehicle control apparatus 10 transmits a first notification signal to the remote operation apparatus 40. When the remote operation apparatus 40 receives the first notification signal, the remote operation apparatus 40 performs a first notification. In the first notification, the remote operation apparatus 40 displays a first message on the display 42. The first message is a message "Summon control is stopped.".

When a non-approach situation in which the user does not approach the vehicle VA (the remote operation apparatus 40 does not approach the vehicle VA) continues for a predetermined time or longer after the stop condition is satisfied, the vehicle control apparatus 10 transmits a second notification signal to the remote operation apparatus 40. When the remote operation apparatus 40 receives the second notification signal, the remote operation apparatus 40 performs a second notification in a different manner from the first notification. In the second notification, the remote operation apparatus 40 displays a second message on the display 42. The second message is a message "Summon control is stopped. Please get into your vehicle immediately.". Furthermore, the remote operation apparatus 40 makes the speaker 46 output the warning sound in a first sound pattern described below, and controls the vibration motor 48 so that the remote operation apparatus 40 vibrates in a first vibration pattern described below.

In the second message, a message "Please get into your vehicle immediately.", which urges the user to get into the vehicle, is added to the first message. Therefore, a manner of the second notification is configured to attract the user's attention more strongly than that of the first notification. Furthermore, in the second notification, the warning sound is output and the remote operation apparatus 40 is vibrated in addition to a display on the display 42 in order to attract the user's attention more strongly.

As described above, since the vehicle control apparatus 10 makes the second notification different from the first notification, the vehicle control apparatus 10 can reduce the possibility that the user who does not approach the vehicle VA after the first notification does not notice a notification "the stop condition is satisfied". Furthermore, since the vehicle control apparatus 10 performs the first notification without the second notification when the user is approaching the vehicle VA, the vehicle control apparatus 10 can reduce a possibility that the user who approaches the vehicle VA feels the notification "the stop condition is satisfied" bothersome.

(Specific Operation)

Figure 2:
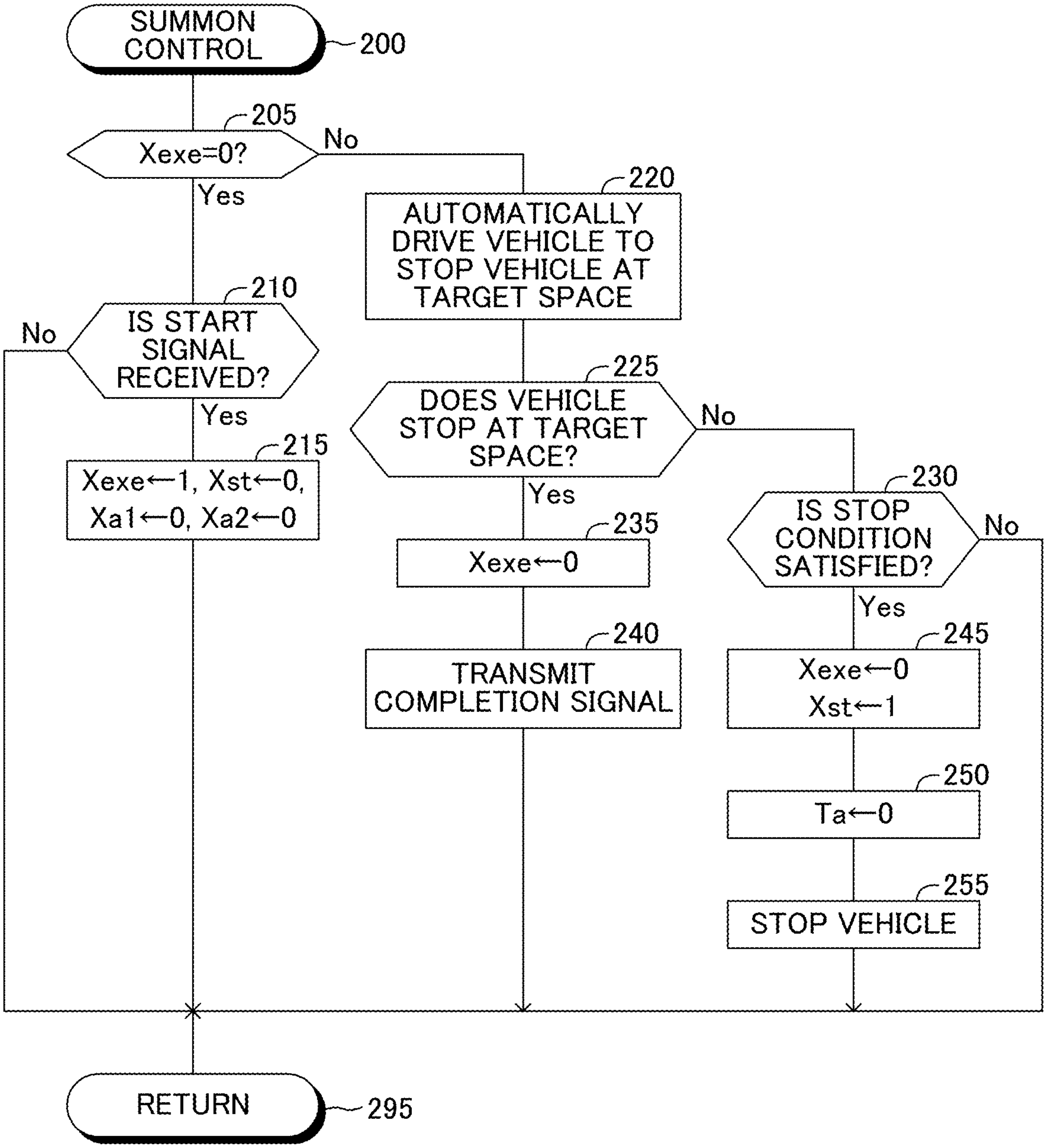
FIG. 2 is a flowchart illustrating a summon control routine executed by a CPU of an ECU shown in FIG. 1.
Figure 3:
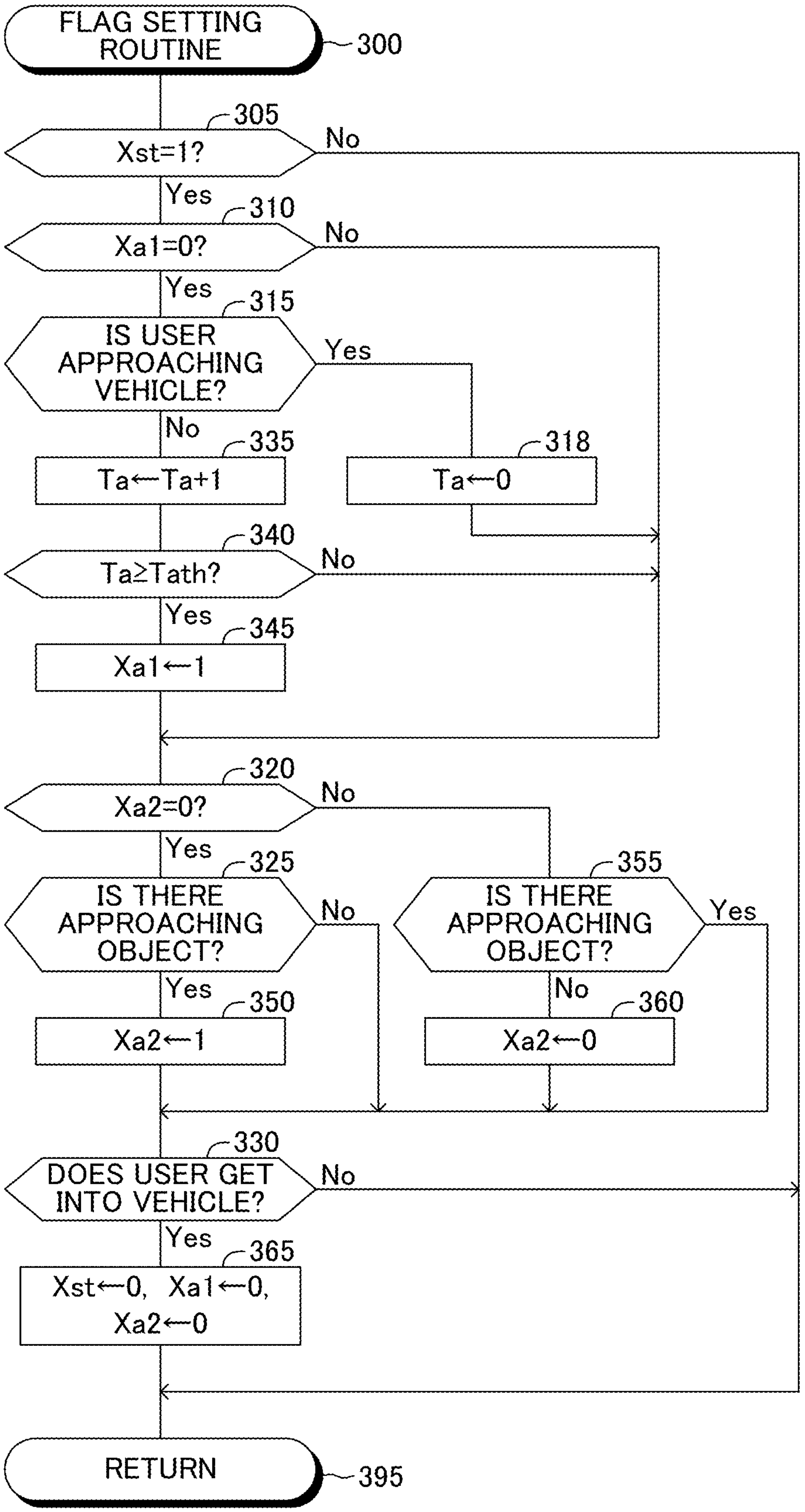
FIG. 3 is a flowchart illustrating a flag setting routine executed by the CPU of the ECU shown in FIG. 1.
Figure 4:
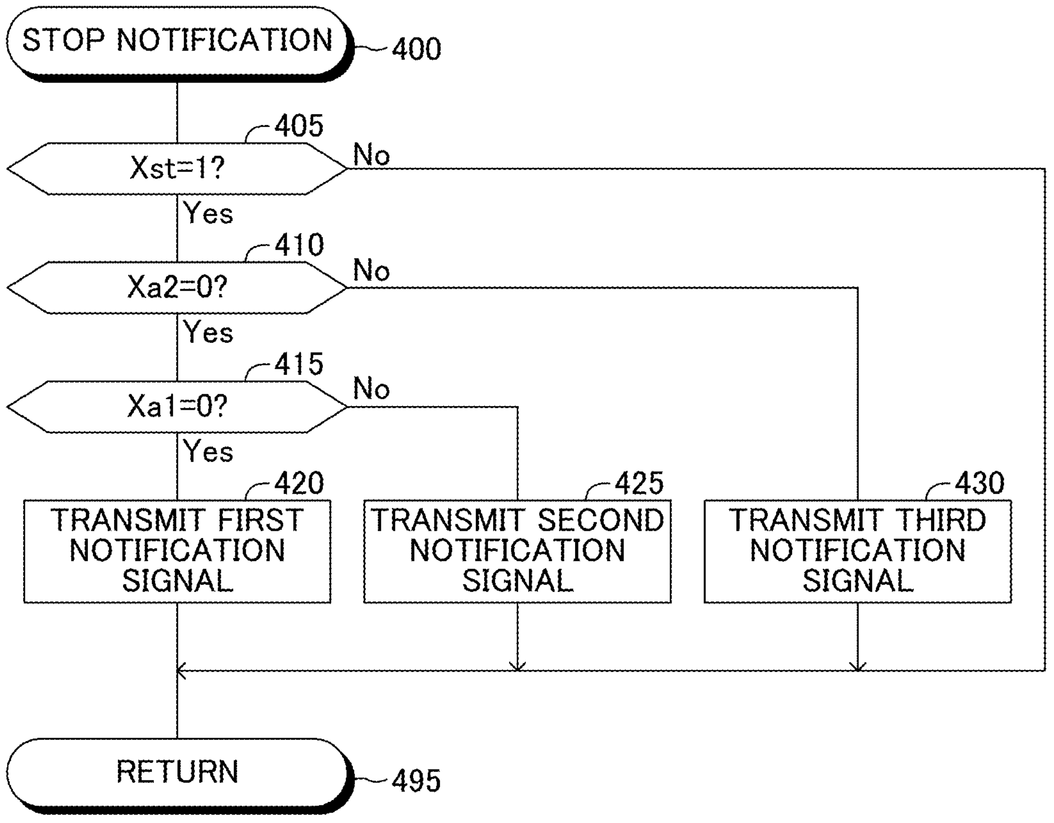
FIG. 4 is a flowchart illustrating a stop notification routine executed by the CPU of the ECU shown in FIG. 1.

The CPU of the ECU 20 executes routines shown by flowcharts in FIGS. 2 through 4 every time a predetermined time elapses.

When an appropriate time point comes, the CPU starts a process from step 200 in FIG. 2 and the process proceeds to step 205. At step 205, the CPU determines whether or not a value of an execution flag Xexe is "0".

The value of the execution flag Xexe is set to "1" when the summon control is started, and is set to "0" when the summon control is ended. The value of the execution flag Xexe is set to "0" in an initialization routine. The initialization routine is executed by the CPU when an ignition key switch (not shown) of the vehicle VA is changed from an off position to an on position.

If the value of the execution flag Xexe is "0", the CPU makes a "Yes" determination at step 205 and the process proceeds to step 210. At step 210, the CPU determines whether or not the vehicle control apparatus 10 receives a start signal transmitted by the remote operation apparatus 40. The remote operation apparatus 40 transmits the start signal to the vehicle control apparatus 10 when the start button for the smart summon control or the reverse summon control is operated.

If the vehicle control apparatus 10 does not receive the start signal, the CPU makes a "No" determination at step 210. In this case, the process proceeds to step 295 and the CPU terminates the present routine tentatively. If the vehicle control apparatus 10 receives the start signal, the CPU makes a "Yes" determination at step 210 and the process proceeds to step 215. At step 215, the CPU sets the value of the execution flag Xexe to "1" and sets a value of a stop flag Xst, a first warning flag Xa1 and a second warning flag Xa2 to "0".

The value of the stop flag Xst is set to "1" when the summon control is stopped due to the stop condition being satisfied. The value of the first warning flag Xa1 is set to "1" when the non-approach situation continues for the predetermined time or longer after the stop condition is satisfied. The value of the second warning flag Xa2 is set to "1" when an approaching object approaching the vehicle VA is present after the stop condition is satisfied. The values of the stop flag Xst, the first warning flag Xa1 and the second warning flag Xa2 are set to "0" when the user get into the vehicle VA or when a next summon control is started. The value of the second warning flag Xa2 is also set to "0" when the approaching object is no longer present.

Thereafter, the process proceeds to step 295 and the CPU terminates the present routine tentatively.

If the value of the execution flag Xexe is "1" when the process proceeds to step 205, the CPU makes a "No" determination at step 205 and the process executes steps 220 and 225.

Step 220: The CPU automatically drives the vehicle VA so that the vehicle VA stops at the target space.

While the vehicle VA is automatically driving, the CPU acquires the image data and the sonar data to determine whether or not a contact object that may contact the vehicle VA is present. If the contact object is present, the CPU determines whether or not the vehicle VA can avoid the contact object. If the vehicle VA can avoid the contact object, the CPU generates an avoidance route and drives the vehicle VA along the avoidance route. If the vehicle VA cannot avoid the contact object, the CPU stops the vehicle VA.

Step 225: The CPU determines whether or not the vehicle VA stops at the target space.

If vehicle VA does not stop at the target space, the CPU makes a "No" determination at step 225 and the process proceeds to step 230.

At step 230, the CPU determines whether or not the stop condition is satisfied.

For example, if a travel distance from a start time point of the summon control is equal to or longer than a threshold distance, the CPU determines that the stop condition is satisfied. Furthermore, if the vehicle VA stops because the vehicle VA cannot avoid the contact object, the CPU determines that the stop condition is satisfied. Furthermore, if a situation in which the vehicle control apparatus 10 does not receives the permission signal continues for a predetermined time or longer, the CPU determines that the stop condition is satisfied.

If the stop condition is not satisfied, the CPU makes a "No" determination at step 230. In this case, the process proceeds to step 295 and the CPU terminates the present routine tentatively.

If the vehicle VA stops at the target space when the process proceeds to step 225, the CPU makes a "Yes" determination at step 225 and executes steps 235 and 240.

Step 235: The CPU sets the value of the execution flag Xexe to "0".

Step 240: The CPU transmits a completion signal to the remote operation apparatus 40.

When the remote operation apparatus 40 receives the completion signal, the remote operation apparatus 40 performs a completion notification. In the completion notification, the remote operation apparatus 40 displays a completion message "Summon control is completed." on the display 42.

Thereafter, the process proceeds to step 295 and the CPU terminates the present routine tentatively.

If the stop condition is satisfied when the process proceeds to step 230, the CPU makes a "Yes" determination at step 230 and executes steps 245 through 255.

Step 245: The CPU sets the value of the execution flag Xexe to "0" and the value of the stop flag Xst to "1".

Step 250: The CPU sets a value of a timer Ta to "0". The timer Ta is a timer for counting a continuation time period that the non-approach situation has continued.

Step 255: The CPU controls a brake actuator (not shown) to stop the vehicle VA.

Thereafter, the process proceeds to step 295 and the CPU terminates the present routine tentatively.

<Flag Setting Routine>

When an appropriate time point comes, the CPU starts a process from step 300 shown in FIG. 3 and determines at step 305 whether or not the value of the stop flag Xst is "1".

If the value of the stop flag Xst is "0", the CPU makes a "No" determination at step 305. In this case, the process proceeds to step 395 and the CPU terminates the present routine tentatively. If the value of the stop flag Xst is "1", the CPU makes a "Yes" determination at step 305 and the process proceeds to step 310. At step 310, the CPU determines whether or not the value of the first warning flag Xa1 is "0".

If the value of the first warning flag Xa1 is "0", the CPU makes a "Yes" determination at step 310 and the process proceeds to step 315. At step 315, the CPU determines whether or not the user is approaching the vehicle VA. In detail, the CPU acquires the current position of the remote operation apparatus 40 from the remote operation apparatus 40 after the stop condition is satisfied, and determines whether or not the remote operation apparatus 40 is approaching the vehicle VA based on a history of the current position. The CPU determines that the user is approaching the vehicle VA when the remote operation apparatus 40 is approaching the vehicle VA.

If the user is approaching the vehicle VA, the CPU makes a "Yes" determination at step 315 and executes steps 318 and 320.

Step 318: The CPU sets the value of the timer Ta to "0".

Step 320: The CPU determines whether or not the value of the second warning flag Xa2 is "0".

If the value of the second warning flag Xa2 is "0", the CPU makes a "Yes" determination at step 320 and the process proceeds to step 325. At step 325, the CPU determines whether or not the approaching object is present based on the image data and the sonar data.

If no approaching object is present, the CPU makes a "No" determination at step 325 and the process proceeds to step 330. At step 330, the CPU determines whether or not the user gets into the vehicle VA. In detail, the CPU determines that the user gets into the vehicle VA when a door of the vehicle VA is unlocked after the current position of the remote operation apparatus 40 is within a predetermined distance from the vehicle VA.

If the user does not get into the vehicle VA, the CPU makes a "No" determination at step 330. In this case, the process proceeds to step 395 and the CPU terminates the present routine tentatively.

If the user is not approaching the vehicle VA when the process proceeds to step 315, the CPU makes a "No" determination at step 315 and executes steps 335 and 340.

Step 335: The CPU adds "1" to the timer Ta.

Step 340: The CPU determines whether or not the timer Ta is equal to or greater than a threshold Tath.

The threshold Tath is set to a value such that the non-approach situation continues for the predetermined time or longer when the timer Ta is equal to or greater than the threshold Tath.

If the timer Ta is smaller than the threshold Tath, the CPU makes a "No" determination at step 340 and the process proceeds to step 320. On the other hand, if the timer Ta is equal to or greater than the threshold Tath, the CPU makes a "Yes" determination at step 340, and the process proceeds to step 345. At step 345, the CPU sets the value of the first warning flag Xa1 to "1" and the process proceeds to step 320.

If the approaching object is present when the process proceeds to step 325, the CPU makes a "Yes" determination at step 325 and the process proceeds to step 350. At step 350, the CPU sets the value of the second warning flag Xa2 to "1". The process then proceeds to step 330.

If the value of the second warning flag Xa2 is "1" when the process proceeds to step 320, the CPU makes a "No" determination at step 320 and the process proceeds to step 355. At step 355, the CPU determines whether or not the approaching object is present.

If the approaching object is present, the CPU makes a "Yes" determination at step 355 and the process proceeds to step 330. If no approaching object is present, the CPU makes a "No" determination at step 355, and the process proceeds to step 360. At step 360, the CPU sets the value of the second warning flag Xa2 to "0". Thereafter, the process proceeds to step 330.

If the user gets into the vehicle VA when the process proceeds to step 330, the CPU makes a "Yes" determination at step 330 and the process proceeds to step 365. At step 365, the CPU sets the values of the stop flag Xst, the first warning flag Xa1 and the second warning flag Xa2 to "0". Thereafter, the process proceeds to step 395 and the CPU terminates the present routine tentatively.

<Stop Notification Routine>

When an appropriate time point comes, the CPU starts a process from step 400 shown in FIG. 4 and the process proceeds to step 405. At step 405, the CPU determines whether or not the value of the stop flag Xst is "1".

If the value of the stop flag Xst is "0", the CPU makes a "No" determination at step 405. In this case, the process proceeds to step 495 and the CPU terminates the present routine tentatively. If the value of the stop flag Xst is "1", the CPU makes a "Yes" determination at step 405 and the process proceeds to step 410.

At step 410, the CPU determines whether or not the value of the second warning flag Xa2 is "0". If the value of the second warning flag Xa2 is "0", the CPU makes a "Yes" determination at step 410 and the process proceeds to step 415. At step 415, the CPU determines whether or not the value of the first warning flag Xa1 is "0".

If the value of the first warning flag Xa1 is "0", the CPU makes a "Yes" determination at step 415 and the process proceeds to step 420. At step 420, the CPU transmits the first notification signal to the remote operation apparatus 40. The process then proceeds to step 495 and the CPU terminates the present routine tentatively. When the remote operation apparatus 40 receives the first notification signal, the remote operation apparatus 40 performs the first notification. In detail, as shown in FIG. 5, the remote operation apparatus 40 displays the first message on the display 42. When the remote operation apparatus 40 receives the first notification signal, the remote operation apparatus 40 does not activate the speaker 46 and the vibration motor 48. Furthermore, the CPU performs a first notification in the vehicle VA when the CPU transmits the first notification signal. In this first notification, the CPU makes the in-vehicle speaker 30 of the vehicle VA output the warning sound "Pawn" and displays a stop message "Control is stopped". on the display 28 of the vehicle VA.

If the value of the first warning flag Xa1 is "1" when the process proceeds to step 415 shown in FIG. 4, the CPU makes a "No" determination at step 415 and the process proceeds to step 425. At step 425, the CPU transmits the second notification signal to the remote operation apparatus 40. Thereafter, the process proceeds to step 495 and the CPU terminates the present routine tentatively. When the remote operation apparatus 40 receives the second notification signal, the remote operation apparatus 40 performs the second notification.

In detail, as shown in FIG. 5, the remote operation apparatus 40 displays the second message on the display 42. Furthermore, the remote operation apparatus 40 makes the speaker 46 output the warning sound in the first sound pattern. When the remote operation apparatus 40 makes the speaker 46 output the warning sound, the remote operation apparatus 40 repeats a sounding time period during which the speaker 46 outputs the warning sound (beep) and a non-sounding time period Ts during which the speaker 46 does not output anything. In the first sound pattern, the non-sounding time period Ts is set to a first time period Ts1.

Furthermore, the remote operation apparatus 40 vibrates the vibration motor 48 in the first vibration pattern. When the remote operation apparatus 40 vibrates the vibration motor 48, the remote operation apparatus 40 repeats a vibration time period during which the vibration motor 48 is activated and a non-vibration time period Tv during which the vibration motor 48 is not activated. In the first vibration pattern, the non-vibration time period Tv is set to a first time period Tv1.

When the CPU transmits the second notification signal, the CPU performs a second notification in the vehicle VA. In the second notification, the CPU controls the in-vehicle speaker 30 and display 28 in the same manner as in the first notification, and activates the horn 32 in a first actuation pattern. In detail, the CPU repeats an actuation time period during which the horn 32 is activated to output a warning sound (fan) and a non-actuation time period To during which the horn 32 is not activated. In the first actuation pattern, the non-actuation time period To is set to a first time period To1.

If the value of the second warning flag Xa2 is "1" when the process proceeds to step 410 shown in FIG. 4, the process proceeds to step 430. At step 430, the CPU transmits a third notification signal to the remote operation apparatus 40. Thereafter, the process proceeds to step 495 and the CPU terminates the present routine tentatively. When the remote operation apparatus 40 receives the third notification signal, the remote operation apparatus 40 performs the third notification.

In detail, as shown in FIG. 5, the remote operation apparatus 40 displays a third message on the display 42. The third message is "Summon control is stopped. Please get into your vehicle and move your vehicle out of the way of other traffic."

Furthermore, the remote operation apparatus 40 makes the speaker 46 output the warning sound in a second sound pattern. In the second sound pattern, the non-sounding time period Ts is set to a second time period Ts2 which is shorter than the first time period Ts1. Therefore, the non-sounding time period Ts between the sounding time period and the next sounding time period in the second sound pattern is shorter than the non-sounding time period Ts in the first sound pattern. In general, the shorter time period (the non-sounding time period Ts) between the sounding time period and the next sounding time period tends to attract the user's attention more strongly. Therefore, the second sound pattern attracts the user's attention more strongly than the first sound pattern.

Furthermore, the remote operation apparatus 40 vibrates the vibration motor 48 in the second vibration pattern. In the second vibration pattern, the non-vibration time period Tv is set to a second time period Tv2 which is shorter than the first time period Tv1. Therefore, the second vibration pattern attracts the user's attention more strongly than the first vibration pattern.

Therefore, the third notification is performed in a manner that attracts the user's attention more strongly than the first and second notifications. If the value of the second warning flag Xa2 is "1", the third notification is performed regardless of whether the value of the first warning flag Xa1 is "0" or "1". In other words, the third notification is performed with priority over the second notification.

Furthermore, When the CPU transmits the third notification signal, the CPU performs a third notification in the vehicle VA. In the third notification, the CPU controls the in-vehicle speaker 30 and display 28 in the same manner as in the first notification, and activates the horn 32 in a second actuation pattern. In the second actuation pattern, the non-actuation time period To is set to a second time period To2 shorter than the first time period To1. Therefore, the third notification in the vehicle VA attracts the user's attention more strongly than the second notification in the vehicle VA.

According to the present embodiment, the remote operation apparatus 40 performs the first notification if the stop condition is satisfied during the execution of the summon control. If the user does not approach the vehicle VA after the first notification, the remote operation apparatus 40 performs the second notification in a different manner from the first notification. This can increase the probability that the user notice that the user needs to get into the vehicle VA.

Furthermore, the third notification is performed with priority over the second notification, so that the user can be notified immediately of a possibility that the user may cause trouble for others.

Modification Example

In the modification example, the first through third notifications are performed in a manner that attracts the user's attention more strongly when a non-boarding condition is satisfied than when the non-boarding condition is not satisfied. If the user does not get into the vehicle VA when a predetermined boarding time has elapsed from a time at which the stop condition is satisfied (a time at which the remote operation apparatus 40 performs the first notification), the non-boarding condition is satisfied. The notification performed when the non-boarding condition is satisfied is referred to as an "emphasis notification".

In detail, as shown in FIG. 5, the remote operation apparatus 40 makes the speaker 46 output the warning sound in a third sound pattern. In the third sound pattern, the non-sounding time period Ts is set to a third time period Ts3 which is shorter than the second time period Ts2. Furthermore, the remote operation apparatus 40 vibrates the vibration motor 48 in a third vibration pattern. In the third vibration pattern, the non-vibration time period Tv is set to a third time period Tv3 which is shorter than the second time period Tv2. In the emphasis notification, the remote operation apparatus 40 displays, on the display 42, the message displayed in any of the first through third notifications in accordance with a user's approach status and a presence status of the approaching object.

Furthermore, the vehicle control apparatus 10 according to the present modification example performs the emphasis notification in the vehicle VA when the non-boarding condition is satisfied. As shown in FIG. 5, in this emphasized notification, the CPU controls the in-vehicle speaker 30 and the display 28 in the same manner as in the first notification, and activates the horn 32 in a third actuation pattern. In the third actuation pattern, the non-actuation time period To is set to a third time period To3 which is shorter than the second time period To2.

Figure 6:
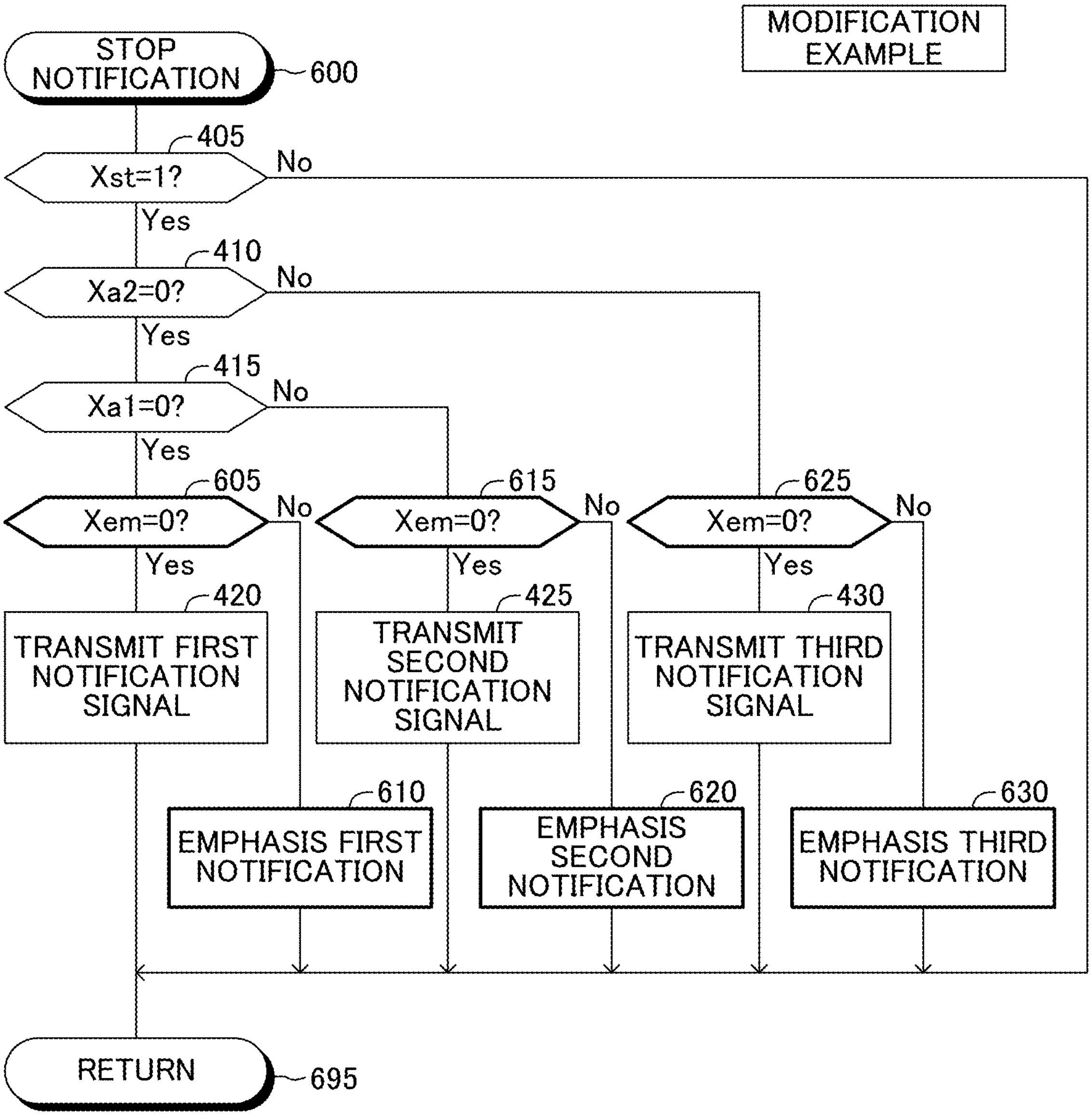
FIG. 6 is a flowchart illustrating a stop notification routine executed by a CPU of an ECU of a vehicle control apparatus according to an modification example of the embodiment of the present disclosure.

The CPU of the ECU 20 of the vehicle control apparatus 10 according to the present modification example executes the routines shown in FIG. 2 and FIG. 3 and executes a routine shown in FIG. 6 instead of the routine shown in FIG. 4. In FIG. 6, the same reference numerals are given to the same processes as those shown in FIG. 4, and descriptions of the processes are omitted.

When an appropriate time point comes, the CPU starts a process at step 600 in FIG. 6. If the value of the stop flag Xst is "1" ("Yes" at step 405 in FIG. 6), the value of the second warning flag Xa2 is "0" ("Yes" at step 410 in FIG. 6), and the value of the first warning flag Xa1 is "0" ("Yes" at step 415 in FIG. 6), the process proceeds to step 605.

At step 605, the CPU determines whether or not a value of an emphasis flag Xem is "0". The value of the emphasis flag Xem is set to "1" when the above non-boarding condition is satisfied, and is set to "0" when the user gets into the vehicle VA or when the next summon control is started.

If the value of the emphasis flag Xem is "0", the CPU makes a "Yes" determination at step 605 and transmits the first notification signal to the remote operation apparatus 40 at step 420 shown in FIG. 6. Thereafter, the process proceeds to step 695 and the CPU terminates the present routine tentatively.

On the other hand, if the value of the emphasis flag Xem is "1", the CPU makes a "No" determination at step 605 and the process proceeds to step 610. At step 610, the CPU transmits an emphasis first notification signal to the remote operation apparatus 40. Thereafter, the process proceeds to step 695 and the CPU terminates the present routine tentatively. When the remote operation apparatus 40 receives the emphasis first notification signal, the remote operation apparatus 40 performs an emphasis first notification by emphasizing the first notification. The emphasis first notification is a type of the above-mentioned emphasis notification. In the emphasis first notification, the first message is displayed on the display 42, the speaker 46 outputs the warning sound in the third sound pattern, and the vibration motor 48 vibrates in the third vibration pattern.

If the value of the stop flag Xst is "1" ("Yes" at step 405 shown in FIG. 6), the value of the second warning flag Xa2 is "0" ("Yes" at step 410 shown in FIG. 6) and the value of the first warning flag Xa1 is "1" ("No" at step 415 shown in FIG. 6), the process proceeds to step 615. At step 615, the CPU determines whether or not the value of the emphasis flag Xem is "0".

If the value of the emphasis flag Xem is "0", the CPU makes a "Yes" determination at step 615 and transmits the second notification signal to the remote operation apparatus 40 at step 425. Thereafter, the process proceeds to step 695 and the CPU terminates the present routine tentatively.

If the value of the emphasis flag Xem is "1", the CPU makes "No" determination at step 615 and the process proceeds to step 620. At step 620, the CPU transmits an emphasis second notification signal to the remote operation apparatus 40. Thereafter, the process proceeds to step 695 and the CPU terminates the present routine tentatively. When the remote operation apparatus 40 receives the emphasis second notification signal, the remote operation apparatus 40 performs an emphasis second notification by emphasizing the second notification. The emphasis second notification is a type of the above-mentioned emphasis notification. In the emphasis second notification, the second message is displayed on the display 42, the speaker 46 outputs the warning sound in the third sound pattern, and the vibration motor 48 vibrates in the third vibration pattern.

If the value of the stop flag Xst is "1" ("Yes" at step 405 in FIG. 6) and the value of the second warning flag Xa2 is "1" ("No" at step 410 in FIG. 6), the process proceeds to step 625. At step 625, the CPU determines whether or not the value of the emphasis flag Xem is "0".

If the value of the emphasis flag Xem is "0", the CPU makes a "Yes" determination at step 625 and transmits the third notification signal to the remote operation apparatus 40 at step 430. Thereafter, the process proceeds to step 695 and the CPU terminates the present routine tentatively.

If the value of the emphasis flag Xem is "1", the CPU makes a "No" determination at step 625 and the process proceeds to step 630. At step 630, the CPU transmits an emphasis third notification signal to the remote operation apparatus 40. Thereafter, the process proceeds to step 695 and the CPU terminates the present routine tentatively. When the remote operation apparatus 40 receives the emphasis third notification signal, the remote operation apparatus 40 performs an emphasis third notification. The emphasis third notification is a type of the above-mentioned emphasized notification. In the emphasis third notification, the third message is displayed on the display 42, the speaker 46 outputs the warning sound in the third sound pattern, and the vibration motor 48 vibrates in the third vibration pattern.

According to the present modification example, the first through third notifications are performed in a manner that attracts the user's attention more strongly when the non-boarding condition is satisfied than when the non-boarding condition is not satisfied. If the user does not get into the vehicle VA after the predetermined boarding time has elapsed from a time point at which the stop condition is satisfied, a possibility that the user hurry to the vehicle VA can be increased.

Although the above embodiments were described using the reverse summon control as an example, the present disclosure can apply to any automatic driving control that the vehicle VA drives automatically to the target space in response to an operation on the remote operation apparatus 40 by the user outside the vehicle VA.

The parking support apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV).

What is claimed is:

1. A vehicle control apparatus configured to execute an automatic driving control for driving a vehicle to a target space based on an instruction transmitted by a remote operation apparatus that a user outside the vehicle operates, wherein, the vehicle control apparatus is configured to:

stop the vehicle and make the remote operation apparatus perform a first notification, when a predetermined stop condition is satisfied while the automatic driving control is being executed;

make the remote operation apparatus perform a second notification in a manner that is different from the first notification, when the user does not approach the vehicle after the first notification; and make the remote operation apparatus perform a third notification in a manner that is different from the first notification and the second notification, with priority over the second notification, when an object that is approaching the vehicle is present after the first notification, the vehicle control apparatus is further configured to, in a case where the vehicle control apparatus makes the remote operation apparatus perform any one of the first notification, the second notification and the third notification as a notification, make the remote operation apparatus perform the notification in a manner that attracts an attention of the user more strongly when a boarding condition is satisfied than when the boarding condition is not satisfied, and the boarding condition is satisfied in a case where the user does not get into the vehicle when a predetermined time period elapses after the first notification.

2. The vehicle control apparatus according to claim 1, wherein the vehicle control apparatus is configured to make the remote operation apparatus perform the second notification in a manner that attracts the attention of the user more strongly than the first notification.

* * * * *